US009528592B2

(12) United States Patent
Sibley

(10) Patent No.: US 9,528,592 B2
(45) Date of Patent: Dec. 27, 2016

(54) SOLID-LUBRICATED BEARING ASSEMBLY

(75) Inventor: Lewis B. Sibley, Coatesville, PA (US)

(73) Assignee: Kinetech Power Company LLC, Allentown, PA (US)

( * ) Notice: Subject to any disclaimer, the term of this patent is extended or adjusted under 35 U.S.C. 154(b) by 521 days.

(21) Appl. No.: 13/533,508

(22) Filed: Jun. 26, 2012

(65) Prior Publication Data

US 2013/0342060 A1    Dec. 26, 2013

(51) Int. Cl.
| *F16C 33/66* | (2006.01) |
| *F16H 57/04* | (2010.01) |
| *F16C 33/10* | (2006.01) |
| *F16C 33/30* | (2006.01) |
| *H02K 7/02* | (2006.01) |
| *H02K 7/16* | (2006.01) |
| *H02K 7/08* | (2006.01) |

(52) U.S. Cl.
CPC ......... *F16H 57/041* (2013.01); *F16C 33/1095* (2013.01); *F16C 33/303* (2013.01); *F16C 33/6696* (2013.01); *H02K 7/025* (2013.01); *H02K 7/16* (2013.01); *F16C 2206/40* (2013.01); *H02K 7/083* (2013.01); *Y02E 60/16* (2013.01); *Y10T 74/19995* (2015.01)

(58) Field of Classification Search
CPC .................................................. F16C 33/6696
See application file for complete search history.

(56) References Cited

U.S. PATENT DOCUMENTS

| 4,797,011 A * | 1/1989 | Saeki et al. ................ 384/13 |
| 4,906,110 A | 3/1990 | Van Wyk et al. |
| 4,934,837 A | 6/1990 | Kawamura |
| 5,040,906 A | 8/1991 | Zornes |
| 5,066,145 A | 11/1991 | Sibley et al. |
| 5,149,208 A | 9/1992 | Zornes |
| 5,356,227 A | 10/1994 | Sibley et al. |
| 5,384,352 A | 1/1995 | Andres et al. |

(Continued)

FOREIGN PATENT DOCUMENTS

| JP | 63072917 A | * 4/1988 |
| JP | 03140623 A | * 6/1991 |

OTHER PUBLICATIONS

Henry E. Mahncke & Alan J. Schwartz (1974): Grease Lubrication of Rolling Bearings in Spacecraft (I), A S L E Transactions, 17:3, 172-181, SKF Industries, Engineering and Research Center, King of Prussia, Pennsylvania 19406.

(Continued)

*Primary Examiner* — Thomas R. Hannon
(74) *Attorney, Agent, or Firm* — MediaComm Innovations; Michael L. Craner

(57) ABSTRACT

A solid-lubricated ball, roller, or plain bearing assembly with solid rings made of solid lubricant loosely fitted inside the bearing envelope for replenishing the solid-lubricant films on the bearing contacting surfaces for the life of the bearing without the need for any re-lubrication. A method is also provided for mounting all-ceramic bearing rings on metal shafts and housings for operation at extremely high temperatures and solid-lubricant idler gears to replenish lubricant films on gear teeth. Cages may be used at extremely high speeds or with very large ceramic balls or rollers and when used the cages require pocket clearances in the circumferential direction several times larger than in the axial direction.

24 Claims, 13 Drawing Sheets

(56) References Cited

U.S. PATENT DOCUMENTS

| | | | |
|---|---|---|---|
| 5,399,026 A * | 3/1995 | Witte | 384/463 |
| 5,486,052 A | 1/1996 | Sibley et al. | |
| 5,520,467 A | 5/1996 | Nojima et al. | |
| 5,566,623 A | 10/1996 | Wareham | |
| 5,570,958 A | 11/1996 | Tsukada | |
| 5,934,236 A | 8/1999 | Rao et al. | |
| 6,095,009 A | 8/2000 | Takagi | |
| 6,167,856 B1 | 1/2001 | Rao et al. | |
| 6,238,744 B1 | 5/2001 | Magoulick et al. | |
| 6,290,397 B1 | 9/2001 | Hashimoto | |
| 6,471,408 B1 | 10/2002 | Ikeda et al. | |
| 6,489,702 B1 | 12/2002 | Bartman | |
| 6,568,857 B1 | 5/2003 | Richard et al. | |
| 6,602,615 B2 | 8/2003 | Sakai et al. | |
| 6,608,422 B2 | 8/2003 | Bartman | |
| 6,679,634 B2 | 1/2004 | Plesh, Sr. | |
| 6,682,224 B2 | 1/2004 | Ooitsu et al. | |
| 6,715,923 B2 | 4/2004 | Miyazaki et al. | |
| 6,746,157 B2 | 6/2004 | Yamamoto et al. | |
| 6,915,745 B2 | 7/2005 | Carder | |
| 6,995,529 B2 | 2/2006 | Sibley | |
| 7,087,862 B1 | 8/2006 | Shaffer et al. | |
| 7,114,852 B2 | 10/2006 | Compassi | |
| 7,178,986 B2 | 2/2007 | Ohtsuki et al. | |
| 7,192,193 B2 | 3/2007 | Iwata | |
| 7,234,869 B1 | 6/2007 | Morando | |
| 7,255,933 B2 | 8/2007 | Sato et al. | |
| 7,320,549 B2 | 1/2008 | Kubota et al. | |
| 7,364,365 B2 | 4/2008 | Begin | |
| 7,640,820 B1 | 1/2010 | West et al. | |
| 7,651,727 B2 | 1/2010 | Miyasaka | |
| 7,766,553 B2 | 8/2010 | Nagai et al. | |
| 7,959,360 B2 | 6/2011 | Fumex | |
| 8,113,717 B2 | 2/2012 | Otsuka | |
| 8,113,718 B2 | 2/2012 | Ito et al. | |
| 2008/0008411 A1 | 1/2008 | Hayashi | |
| 2009/0054276 A1 | 2/2009 | Himeno et al. | |
| 2010/0061674 A1 | 3/2010 | Koda et al. | |
| 2010/0189385 A1 | 7/2010 | Muramatsu | |
| 2010/0220943 A1 | 9/2010 | Mikami et al. | |

OTHER PUBLICATIONS

Lewis Sibley & Bala R. Nair (2005): Commercial Spool Pump Bearing Performance Testing, World Tribology Congress III, Sep. 12-16, 2005, Washington, D.C., USA.

H. Zhao, S.K. Chang, I. Armitage & J. Antolazzi: Evaluation of dry gear lubricants for high-cycle space applications, European Space Agency, SPAR Aerospace Limited, SPAR Space Systems 9445 Airport Road, Brampton. Ontario, Canada, L6S 413.

* cited by examiner

SOLID-LUBRICATED BEARING ASSEMBLY

CROSS-REFERENCE TO RELATED PATENT APPLICATIONS

This application relates to U.S. Pat. Nos. 5,066,145, 5,356,227, 5,486,052, and 6,995,529. The aforementioned disclosures are incorporated by reference in their entirety.

BACKGROUND

The present disclosure relates generally to bearings and specifically to ball, roller and slider bearings, gears and seals, all having solid lubricants, occasionally in addition to a single initial charge only of lubricating grease, which can operate in adverse environments for long times without the necessity of repeated application of lubricating oil or grease. The present invention may be integrated with advanced gas-turbine and reciprocating internal-combustion engines, vehicular wheel bearings, railway tread-brake pivot bearings and high-speed motor technology, continuous fiber-reinforced composite or dry-filament wound flywheel ring and mounting-hub technology, and ultra-compact motor/generator and DSP-based electronic controller technology, for low-cost reliable gas-turbine and reciprocating engines, ultra-high-speed motors and long-life flywheel energy storage systems.

Ball, roller, sleeve and plain bearings are known and have been used in mechanical devices essentially since the beginning of the industrial revolution. While such bearings are serviceable in a wide variety of applications and environments, these conventional bearings have some disadvantages. One major disadvantage is the need for recirculating lubricating oil or periodic replenishment of grease to provide adequate lubrication between the moving surfaces, so that friction does not cause the bearings to overheat and self-destruct during operation. Another disadvantage in high-speed machines is the need to avoid excessive vibratory bearing loads as the rotor runs through critical speeds. An improved means to prevent water and abrasive contaminants from entering the bearings, such as for vehicular wheels, as well as a means for replenishing the solid-lubricant films on the contacting surfaces of gear teeth are desired.

In some applications such as high-speed flywheel energy storage systems, conventional bearings do not have sufficient life in the vacuum environment required to minimize windage losses and carbon-fiber composite flywheel rim overheating. To date such systems have relied on the use of expensive, energy-consuming, active magnetic bearings. Lubricating greases with the ultra-low volatility synthetic lubricating oils required in the high vacuum of such systems with lower cost ball bearings, do not have the additive response of synthetic hydrocarbons or conventional petroleum-based oils, so that they have limited boundary lubricating ability and bearing life.

Conventional petroleum-based oil and grease lubricants tend to dry out, oxidize and/or evaporate over time and generally must be replaced periodically for the bearing to function adequately over its design life. To perform such lubrication, workers require access to the bearings which means downtime for the associated machinery.

Adequately reliable solid lubricated, ultra low- or high-temperature bearing systems do not exist, especially in high-vacuum environments, even though such bearing systems would reduce maintenance and increase permissible operating temperature ranges and reliability of the associated machinery.

Use of solid lubricants and dry, wear-resistant materials in low and high temperature and high vacuum bearing applications has been attempted, using molybdenum disulfide, graphite and Teflon. The bearing industry markets several types of dry bearing materials based on such molybdenum disulfide, graphite, Teflon and other plastics to be used as solid lubricants. Woven glass fiber-reinforced Teflon bearings are fabricated by bonding a stiff metal backing to a thin composite layer of soft (but solid) lubricating Teflon, reinforced with a hard glass fabric so that a very thin film of Teflon lubricates the glass fibers with a minimum of deflection, plastic flow and wear. The current wisdom in the industry is that such solid-lubricant materials must be in continuous or nearly continuous contact with the surfaces to be lubricated like a lead-graphite pencil writing on paper, whereas this invention is counter to that intuitive concept, since so much less lubricating material is required to effectively lubricate the concentrated contacts in ball and roller bearings and gears, where we have measured successfully lubricating films at rolling contacts of only a few millionths of an inch thick by an X-ray method (see Sibley and Orcutt, "Elastohydrodynamic Lubrication of Rolling-Contact Surfaces," ASLE Transactions, Vol. 4, 234-249, 1961), whereas the lubricating films in sliding contacts are a thousand times thicker at a few thousandths of an inch thick and thus require much more lubricating material to replenish.

In high-speed rotors operating above their critical speeds, the bearings are usually lubricated with circulating oil. In the case of high-speed ball or roller bearings, this lubricating oil is often circulated through an annular space in the housing that separates the non-rotating bearing ring from the main housing of the machine, so that the radial load on the bearing squeezes this oil film. The purpose of this squeeze film construction is to provide an elastic member in the form of the hydrodynamically-generated pressures in a thin oil film with viscous damping properties to separate the rotor from the machine supporting structure. Thus the vibrations of the rotor are dampened as it passes through its critical speeds either speeding up or slowing down from its normal super-critical operating speed.

Another common design for this purpose is to use elastomeric O-rings around the stationary bearing ring to separate the ring from the housing and thus provide the elastic compliance and damping required. However, the life of such O-rings under the high cyclic stresses in such applications is quite limited, and it is often not possible within the dimensional constraints available to obtain high enough damping to keep the vibratory bearing loads within acceptable limits.

For a self-contained lubrication system using the improved solid-lubrication configurations of this invention, or even a greased-for-life system which is now possible with these improved bearing designs at very high speeds, an alternative to the above-described oil squeeze film and O-ring dampers is needed to prevent excessive bearing vibratory loads at the critical speeds of machines with super-critical operating rotors without any damping losses. Important examples of such rotors are gas-turbine engines and the continuous-fiber-reinforced composite rings in flywheel energy storage systems ("FESS").

In known solid-lubricated bearing applications, sporadic catastrophic bearing failures occur. Also, self-contained so-called greased-for-life bearings have limited high-speed capabilities and require frequent re-lubrication intervals. Reliable, self-contained, long-life solid-lubricated or grease-packed bearing designs are needed to reduce maintenance and to facilitate higher operating speeds and temperatures that can greatly improve the performance and energy efficiency of machines. In ultra-high-temperature applications, standard bearing steels do not retain sufficient hardness at temperature, so that all-ceramic bearings are required, and mounting devices are needed to support ceramic bearings on metal shafts and housings over wide temperature ranges without cracking such rings from their large differential thermal expansivity compared to metals.

When ceramic balls or rollers are used, it is often possible to eliminate the cage or retainer that separates these rolling elements, except for very high speeds or very large bearings, when the ball or roller inertial forces are high enough to cause damage at the ball/ball or roller/roller contacts, so that cages are then required. New designs of cages are needed to reduce as much as possible their interference with the motion of the balls or rollers and their high-shear damage to the lubricant films by skidding at the ball or roller-raceway contacts, and design guidelines are needed to compensate for roller skewing and skidding in solid-lubricated roller bearings. Also, cooling provisions are required to prevent excessive differential thermal expansions of the rings of solid-lubricated bearings.

The present disclosure contemplates a new and improved solid-lubricated bearing assembly that overcomes current limitations.

SUMMARY

The present disclosure provides a solid-lubricated ball, roller, and slider bearing as well as gear assemblies requiring essentially no conventional periodic re-lubrication or maintenance. The invention also provides high-temperature solid lubricants and lubrication-facility geometries for ball, roller, and slider bearings, and for their mounting systems in high-speed super-critical machines to minimize bearing loads and vibrations during high-speed operation, as well as in high-temperature machines to avoid ceramic bearing ring fracture from differential thermal expansions and improved low-friction seals to exclude harmful contaminants from bearings.

In one aspect, provided herein is a solid-lubricated bearing assembly, including: an outer bearing ring, an inner bearing ring (with the inner and outer bearing rings including races for retaining the balls or rollers of the bearing assembly), a plurality of balls or rollers journaled for rolling contact with respective races of the outer and inner bearing rings and a solid lubricant member in occasional contact against one or more of the balls or rollers journaled between the inner and outer rings, with the inner and outer rings connected to load-applying or load-carrying members, such as those described in the research paper by Sibley and Nair entitled "Commercial Spool Pump Bearing Performance Testing" published in World Tribology Congress III, No. WTC2005-63282. In another aspect, the solid lubricant member is contained within the dimensional envelope of a sliding bearing ring configuration like that above but without the plurality of balls or rollers. In yet another aspect, the rotating ring (not the stationary ring as with conventional squeeze-film and elastomeric O-ring dampers) is mounted on the machine rotor by a device that changes the predominant critical rotor speed as it is accelerated up to the super-critical design speed, in such a manner that the rotor rotates around its mass center at high speed, not the geometric center of the bearings, so that the bearings are never subjected to the high unbalance loads at the critical speed of conventional rotors.

For the high vacuum environment of a FESS, a low-volatility synthetic grease may be used as an adjunct lubricant in this invention using a porous plastic element such as Nylasint impregnated with the same low-volatility oil that is used in the above grease to keep the lubricating grease wet and prevent its drying out in the vacuum. This invention includes use of tortuous labyrinth seals to limit any residual outgassing of the above low-volatility grease system to acceptable levels, such as those described in the paper by Mahncke and Schwartz entitled "Grease Lubrication of Rolling Bearings in Spacecraft" published in ASLE Transactions, Vol. 17, No. 3, Pages 172-181.

The solid-lubricating member is preferably carbon graphite and preferably occasionally contacts the bearing balls, rollers, or other moving surfaces inside the bearing, so that the graphite submicron wear particles are caught between the bearing balls or rollers and the ring raceways, and thus replenish the solid-lubricant films, leaving a thin graphite lubricating film thereon and producing an ultra-fine particulate wear debris of solid lubricating material. As the bearing operates, this wear debris is caught between the balls or rollers and the race surfaces and the graphite film is carried by the rotating balls or rollers to the race surfaces against which the balls or rollers are journaled so that a graphite film forms (between the balls or rollers and the race surfaces) and desirably replenishes the films there for the life of the bearing, without subsequent need to apply additional lubricant. This intermittent-contact lubricating film replenishment method of this invention is counter-intuitive to the conventional wisdom in the industry that continuous contact of the solid-lubricating member is required to provide effective amounts of solid-lubricating film material, since so much less, a thousand times less, material is required, to effectively replenish films of so much less thickness than in sliding contacts with which most engineers are familiar.

Fully dynamic computer analyses of high-speed bearings show that the balls move randomly so as to impact these solid-lubricant rings, and in roller bearings the rollers usually skew randomly against solid-lubricant rings built into such bearings to contact the roller ends. The lubricating member is preferably in the form of a ring but can also be in the form of inserts of solid-lubricant material or a relatively thick bonded solid-lubricant coating on the cage.

In a second aspect, the invention embraces a sleeve bearing in which a solid lubricant, preferably in the form of a ring, may be in the sleeve and biased inwardly against a member moving within the sleeve. In the sleeve bearing aspect of the invention, the solid lubricant may alternatively be within the member moving within the sleeve. In such cases the lubricant material is biased outwardly against the sleeve. A solid lubricant film forms on the moving surfaces, eliminating further need for application of lubricant over the useful life of the bearing.

In all instances, position of the solid lubricant may vary depending on the application in which the bearing is used. For very slow speed applications, in which the generation of solid lubricant transfer films and film regenerating wear debris is so slow as to not be sufficient for adequate long-life lubricating film replenishment in the bearing, an alternate method for practicing the invention is the use of solid-lubricating blocks or spacers between the balls or rollers. Such spacers provide more fine solid-lubricant wear debris generation and transfer filming contacts within the bearing than the ring, needed at very slow speeds, but like the ring must be so dimensioned that they exert the least amount of restraint to the orbiting motion of the balls or rollers. This minimum orbiting restraint feature is required to minimize the solid-lubricant film wear on the ball or roller/raceway surfaces in the bearing which is critical to reliable long-life operation, and is the unique characteristic distinguishing this invention from other similar prior art configurations. For very high speed applications, when the centrifugal forces on the rings or spacers are high enough to cause excessive wear and stresses, a metal band is used to contain the stresses in the solid ring or a cage or separator is preferred in some cases with the solid-lubricant material incorporated as inserts or coatings on the contacting surfaces of the cage with the ring guide lands and with the balls or rollers. Again like the ring, in order to minimize the orbiting restraining of the balls or rollers, the cage pocket clearances must be very large in the orbiting direction and the guide lands must have very low clearance and friction. These features are contrary to the previous state-or-the-art, in which the cage pocket clearance is comparable to or sometimes smaller than the cage land clearance, and not roughly an order of magnitude larger as in this invention to avoid the cage vibration instability often plaguing high-speed solid-lubricated ball and roller bearings.

The required low friction of the cage guide-land surfaces is provided by low-friction hydrodynamic or gas-lubricated step-bearing or similar geometry on the cage guide lands. The desirable self-acting hydrodynamic lubrication of these cage land surfaces is facilitated by the centrifugal warping of the cage rails at high speeds from the radially outward deflection of these rails at each cage bar between each ball or roller pocket in the cage, thus providing a scalloped-shape cage-land sliding surface of the approximately appropriate geometry for tapered-land hydrodynamic lubricant film formation. Very thin bonded solid-lubricant coatings on the balls or rollers and races provide initial run-in lubrication of the contacting surfaces in the bearing until the transfer-film mechanism builds up to provide continuous film replenishment for long bearing life.

It is important in achieving maximum bearing life with this invention that the solid-lubricant elements be designed into the bearings in such a way to avoid such high loads on the solid-lubricant film replenishing surfaces that undesirably large particles wear off and not produce the desirable consistent supply of sub-micron "wear" replenishment particles. It is also desirable in the preferred embodiment of the invention to use somewhat more open conformity of ball bearing raceways or crowning of roller bearing contacts than is used conventionally, to allow sufficient space near the load-carrying contacts in the bearings for solid-lubricant film channeling. At the same time, proper execution techniques for the bearing raceways must be used to avoid excessive edge contacts that might disrupt the lubricant films on the contacting surfaces. All these features are aimed at the preferred embodiment of the invention, namely to transfer solid-lubricant films directly onto the tracks of the ball, roller or slider contacts by the intermittent contact of the solid-lubricant member with the hard parts of the bearing, contrary to the conventional wisdom that continuous contact is required, and at the same time not to significantly restrain the orbiting motion of the rotatable elements in the bearings.

In a preferred embodiment of the invention for FESS's, the predominant radial load on the bearings is a residual unbalance load that rotates with the rotor, and the predominant thrust load is the preload usually provided by springs acting against the stationary bearing rings which must therefore be mounted on the stationary part of the structure with a sliding fit, not a press fit. Thus, these stationary bearing rings will tend to rotate slowly on their fit surfaces, eventually wearing so much that they become loose and cause bearing failures unrelated to the above lubrication of the ball or roller and race surfaces. Such failures are prevented by another aspect of this invention in which the fit surfaces of such ball or roller bearings are solid lubricated according to this invention as sliding bearings. As an example, the thrust face contacting the stationary ring is machined with several narrow radial slots to facilitate the entrapment of lubricant debris and generate hydrodynamic films there by means of a simple common thrust land bearing geometry.

While carbon-graphite, appropriately impregnated with known fillers, is the presently preferred material for the solid lubricant, other candidate materials include molybdenum disulfide, tungsten disulfide and second generation complex metal chalcogenides which are specially adapted for high-temperature bearing performance. These new solid lubricant material formulations, like the presently preferred carbon-graphite, can be incorporated into self-contained solid-lubricant compacts and coatings and designed into the advanced design bearings of the invention.

In yet another aspect of this invention, the rotating ring (not the stationary ring as with conventional squeeze-film dampers) is mounted on the machine rotor by a device that changes the predominant critical rotor speed as it is accelerated up to the design speed, in such a manner that the rotor rotates about its mass center and not the geometric center of the bearings, and thus the bearings are never subjected to the high unbalance loads at the critical speed of conventional rotors. This vibration decoupling system is achieved by an annular contacting space between the rotor and the rotating bearing ring, connected with a flexible decoupling element, either a simple elastomeric O-ring or a vulcanized elastomeric element or a flexible metallic element, all designed with a suitable compliance for obtaining the rotor critical speeds described below.

The above annular space is fitted tightly when the rotor is stationary and then opens up by centrifugal radial deflection of the assembly into a sufficiently large gap, depending on the magnitude of the residual rotor unbalance, at some specified rotor speed. This lift-off speed is selected to be approximately two-thirds of the first rotor critical speed when the gap is closed and approximately one-third higher than the modified critical speed when the gap is open, so that the rotor never runs right at the critical levels and thus never subjects the bearings to the high vibration amplitudes that would result from dry, undamped operation at the rotor critical speeds. It is important in the successful practice of this invention to design the flexible elements and all other bearing mounting structures to make sure that no additional deleterious critical speeds are introduced into the rotor system.

In the aspect of this invention regarding the solid lubrication of gears, the solid-lubricant films on the contacting surfaces of gear teeth that are known to provide sufficient lubrication, as described in the paper by H. Zhao, et al "Evaluation of Dry Gear Lubricants for High-Cycle Space Applications," Proc. Sixth European Space Mechanisms & Tribology Symposium, Technopark, Zurich, Switzerland, 4-6 Oct. 1995 (ESA SP-374, August 1995), are replenished by an idler gear made of solid lubricant material that replenishes the solid-lubricant films on the gear contacting surfaces by generating sub-micron size solid-lubricant wear debris that is caught in the gear-teeth contacts as the gear-set rotates.

BRIEF DESCRIPTION OF DRAWINGS

The accompanying drawings, which are incorporated in and constitute a part of the specification, illustrate embodiments of the invention and together with the detailed description herein, serve to explain the principles of the invention. The drawings are only for purposes of illustrating preferred embodiments and are not to be construed as limiting the invention.

DETAILED DESCRIPTION

Figure 1:
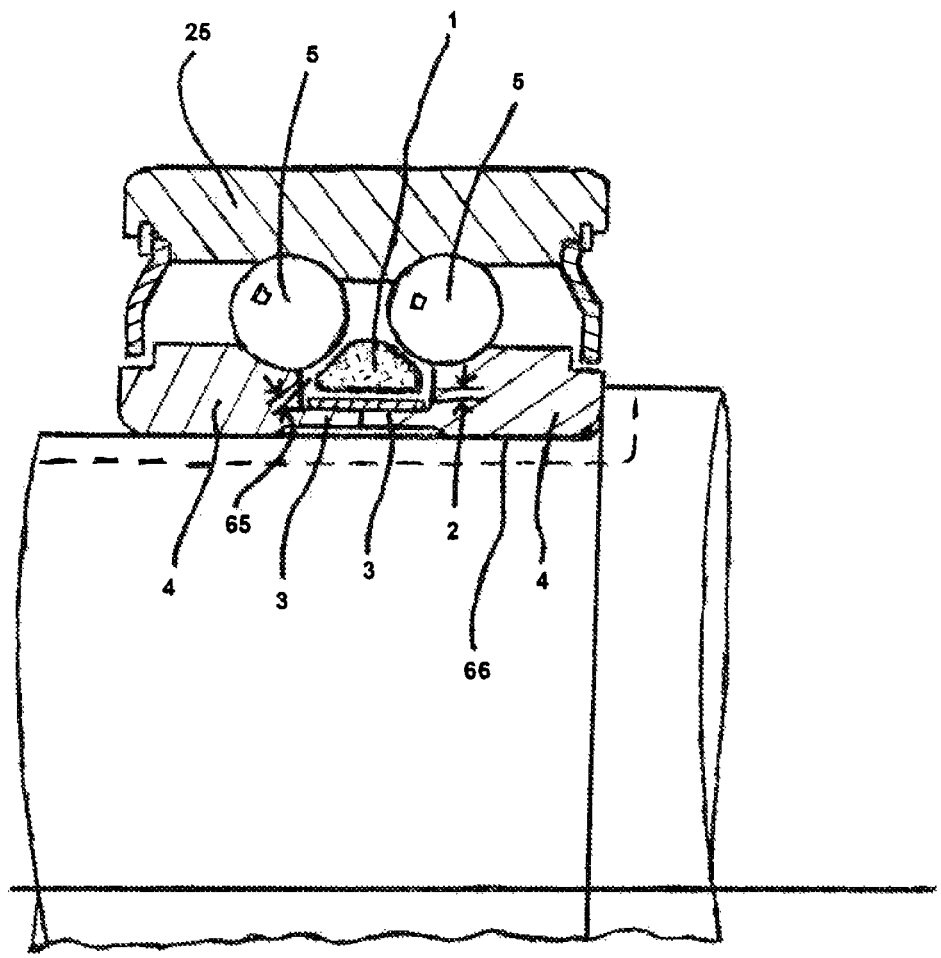
FIG. 1 is a half cross-section of a high-speed double-row ball bearing with a solid-ring lubricant film replenishment element, in accordance with one or more aspects of the present invention.

Referring to the drawings, wherein like reference numerals are used to indicate like or analogous components or steps throughout the several views, and with particular reference to FIG. 1, there is illustrated an exemplary solid-lubricated bearing assembly. As seen in FIG. 1, a solid-lubricant replenishing ring 1 is located between the two rows of balls 5 and is made as a solid ring, not split as in U.S. Pat. No. 5,066,145, in this high speed bearing. The ring 1 is dimensioned to have a slightly larger radial clearance 2 inside the counterbored sides 3 of the two bearing inner rings 4, and a smaller clearance 65 in an angular direction between its contact with the balls 5 in each of the two rows. The inertial forces on this ring 1 are sufficient at moderate to high bearing rotating speeds to transfer solid-lubricant material and wear debris from impacting of the contacts between the ring 1 onto the balls 5. Since this solid-lubrication system does not transfer any heat generated in the bearing at high speed, several axial grooves 66 are machined in the shaft under the inner rings 4 for circulation of cooling fluid without washing out the solid lubricant material by circulating such cooling fluid through the bearing.

Figure 2:
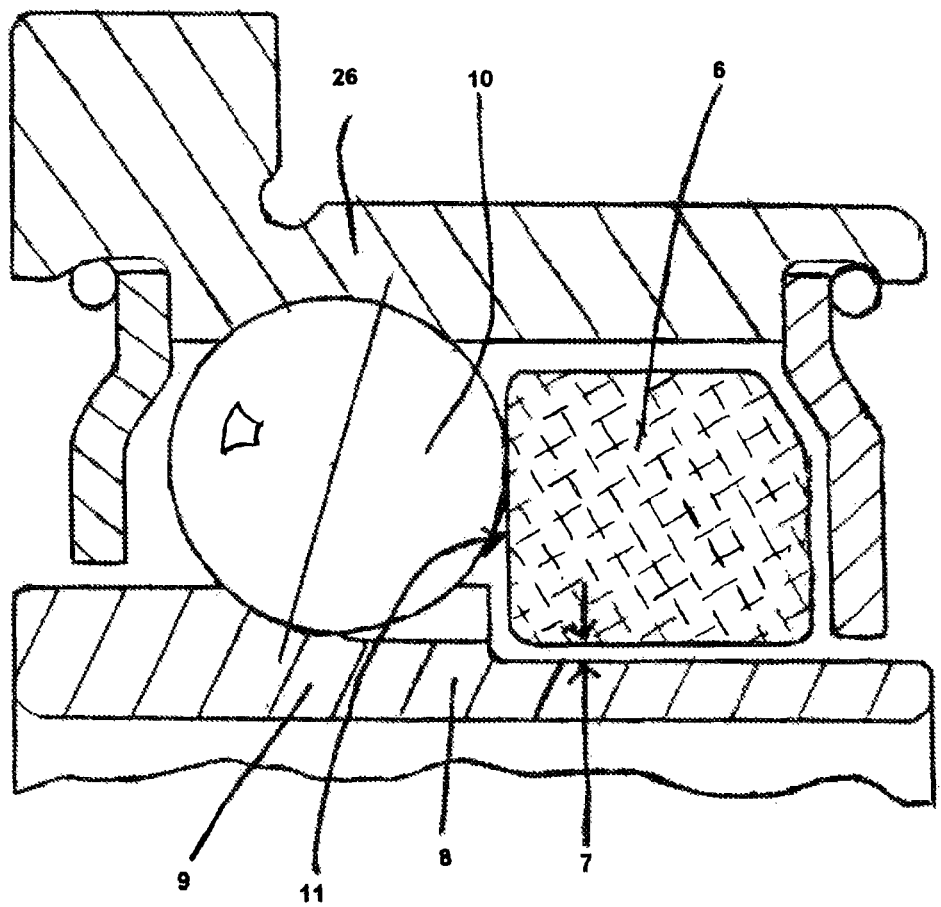
FIG. 2 is a half cross-section of a high-speed single-row ball bearing with a solid-ring lubricant film replenishment element, in accordance with one or more aspects of the present invention.

Referring now to FIG. 2, a solid-lubricant replenishing ring 6 is made as a solid ring in this high speed bearing. This ring 6 is dimensioned to have relatively large radial clearance 7 inside the counterbored side 8 of the bearing inner ring 9, and a smaller axial clearance between its contact with the balls 10 and the inside face 11 of the solid-lube ring 6. The inertial forces on this ring 6 are sufficient at high bearing rotating speeds to transfer solid-lubricant material and wear debris from impacting contacts onto the balls 10.

Figure 3:
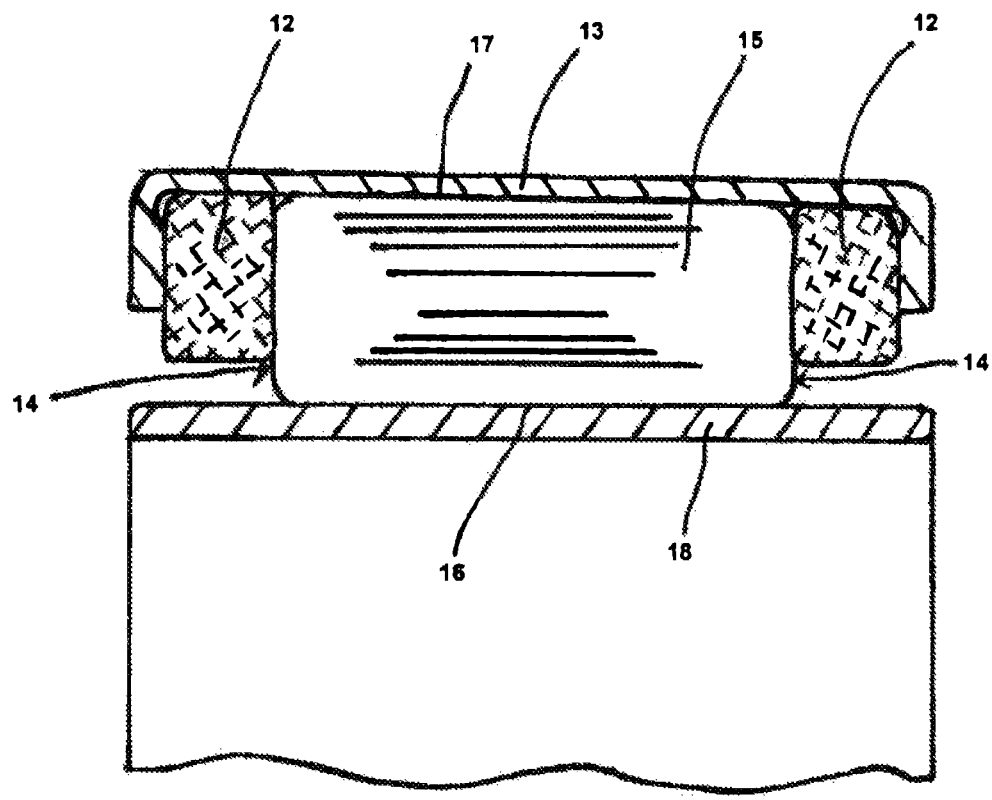
FIG. 3 is a half cross-section of a roller bearing with solid-ring lubricant film replenishment elements mounted on each end of the rollers, in accordance with one or more aspects of the present invention.

As seen in FIG. 3, similar solid rings 12 made of solid lubricant material are fitted into the ends of the outer ring 13 of a cylindrical roller bearing, so that these solid-lube rings 12 contact both ends 14 of all the rollers 15 in the bearing. Rollers of this kind are known to skew slightly, usually in a random way, during operation of the bearing as they roll in their raceways 16 and 17 in the inner ring 18 and the outer ring 13, respectively.

These solid-lubricant rings 12 contact the rotatable elements 15 intermittently. In this way the solid lubricant material not only is transferred directly to the rotatable elements 15 but solid-lubricant wear debris is generated at the contacts with the rotatable elements 15. The extra solid-lubricating material formed in the assembly in this way provides an additional source of material for the replenishment of the solid-lubricating films on the load-carrying tracks in the bearing.

Figure 4:
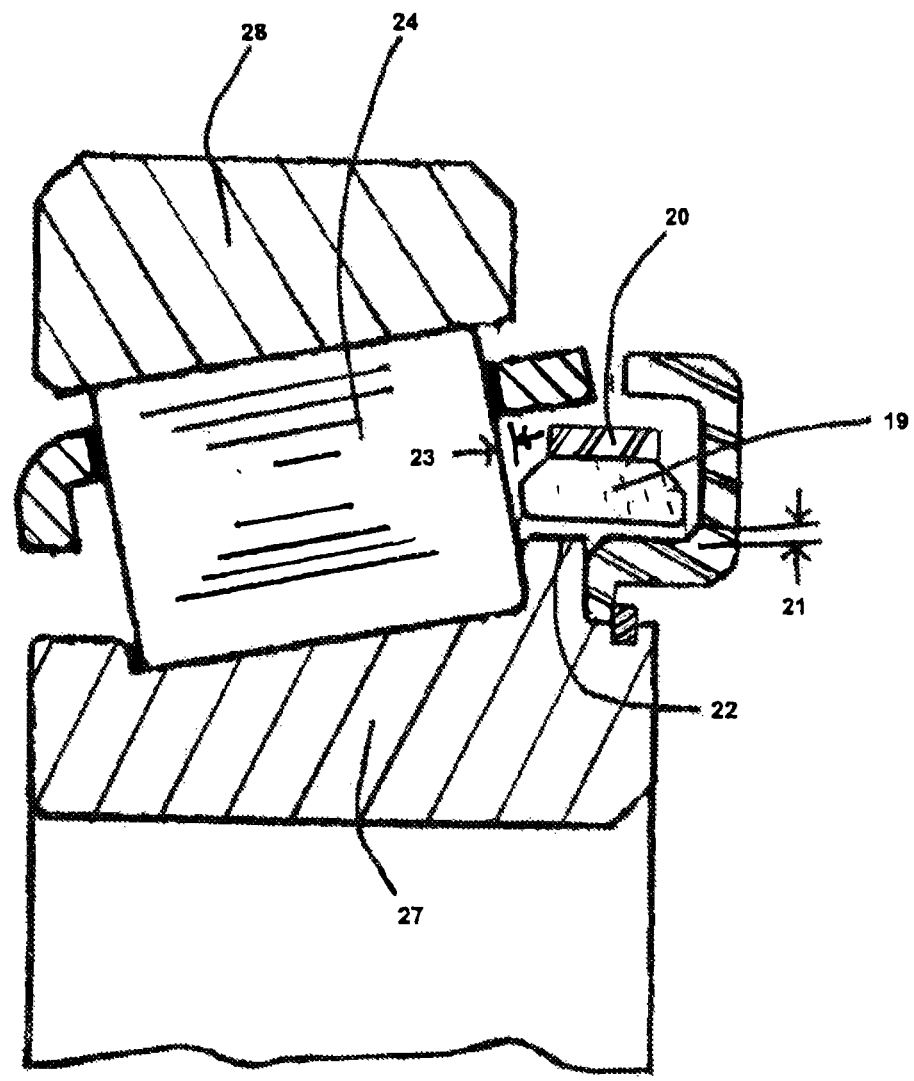
FIG. 4 is a half cross-section illustrating a portion of a tapered roller bearing assembly, in accordance with one or more aspects of the present invention.

As depicted in FIG. 4, a thin-section solid-lubricant replenishing ring 19 is held together with a thermally shrink-fitted metal band 20. The ring 19 is dimensioned to have a slightly larger radial clearance 21 over the inner-ring shoulder 22, and a smaller axial clearance 23 between its contact with the larger end of the tapered rollers 24 and the inside face of the solid-lube ring 19. The inertial forces on this ring 19 are sufficient at the bearing rotating speeds to transfer a thin layer of solid-lubricant material and wear debris from impacting contacts onto the ends of the rollers 24 and the inner-ring land 22.

When high-speed operation is important, the rotatable bearing elements 5 in FIG. 1, the bearing elements 10 in FIG. 2, the bearing elements 15 in FIG. 3, and the bearing elements 24 in FIG. 4 are desirably made of ceramic material having low density and thus low inertial loads. Also at the bearing operating speeds, the inertial impact loading of the lubricating ring 1 in FIG. 1, the lubricating ring 6 in FIG. 2, the lubricating ring 12 in FIG. 3, and the lubricating ring 19 in FIG. 4 are sufficient to provide the required lubricating transfer films and microscopic wear debris, so that no split nor compression is necessary and instead the rings 1, 6, 12 and 19, respectively, are made as solid rings.

Use of impregnated carbon-graphite rings 1 in FIG. 1, the rings 6 in FIG. 2, the rings 12 in FIG. 3, and the rings 19 in FIG. 4 to provide lubrication for the bearing assemblies in the disclosed embodiments eliminates the need for periodic application of petroleum-based or synthetic lubricants. In using these bearing assemblies, it may be necessary to initially apply a small amount of a compounded petroleum-based or synthetic lubricant. The necessity for initial lubrication depends both on the need for corrosion protection in storage and on hardness of the graphite grade employed and speed at which the graphite lubrication member initially wears-in to form the graphite film on the rotatable bearing elements 5, 10, 15, and 24 and the raceway surfaces on rings 4, 25, 9, 26, 13, 18, 27, and 28, as best seen in FIGS. 1-4. At most, only a small initial application of a petroleum-based or synthetic lubricant is necessary. No re-lubrication is needed over the useful life of the bearing because the graphite provided by rings 1, 6, 12, and 24 provides all further bearing lubrication, since the total amount of lubricating material required to lubricate the solid contacting surfaces in ball and roller bearings is several orders of magnitude less than in sliding bearings. Therefore, these bearings may be used in severe environments in which shutdown for periodic lubrication is undesirable or unfeasible.

The bearing assembly should be protected from rust after assembly and this is normally accomplished by applying a preservative oil or other protective material to the bearing assembly. Bearings using the solid, dry lubricant of this invention can operate at temperatures ranging from cryogenic levels up to about 450 degrees Fahrenheit and higher with special temperature-resistant bearing materials and high-temperature impregnated solid lubricants.

The minute amount of dry lubricant material forming the lubricant film between the elements 5, 10, 15, and 24, and their respective race surfaces 4, 25, 9, 26, 13, 18, 27, and 28 makes these bearing assemblies especially suitable for applications requiring a high degree of cleanliness. The amount of the rings 1, 6, 12, and 20 sacrificed to form the lubricating film on the elements 5, 10, 15, and 24, respectively, and their respective race surfaces 4, 25, 9, 26, 13. 18, 27, and 28 is so minute, that there is literally enough to provide lubricating films on the raceways of only a few millionths of an inch thick, which is normally not detectable by unaided human eye.

Figure 5:
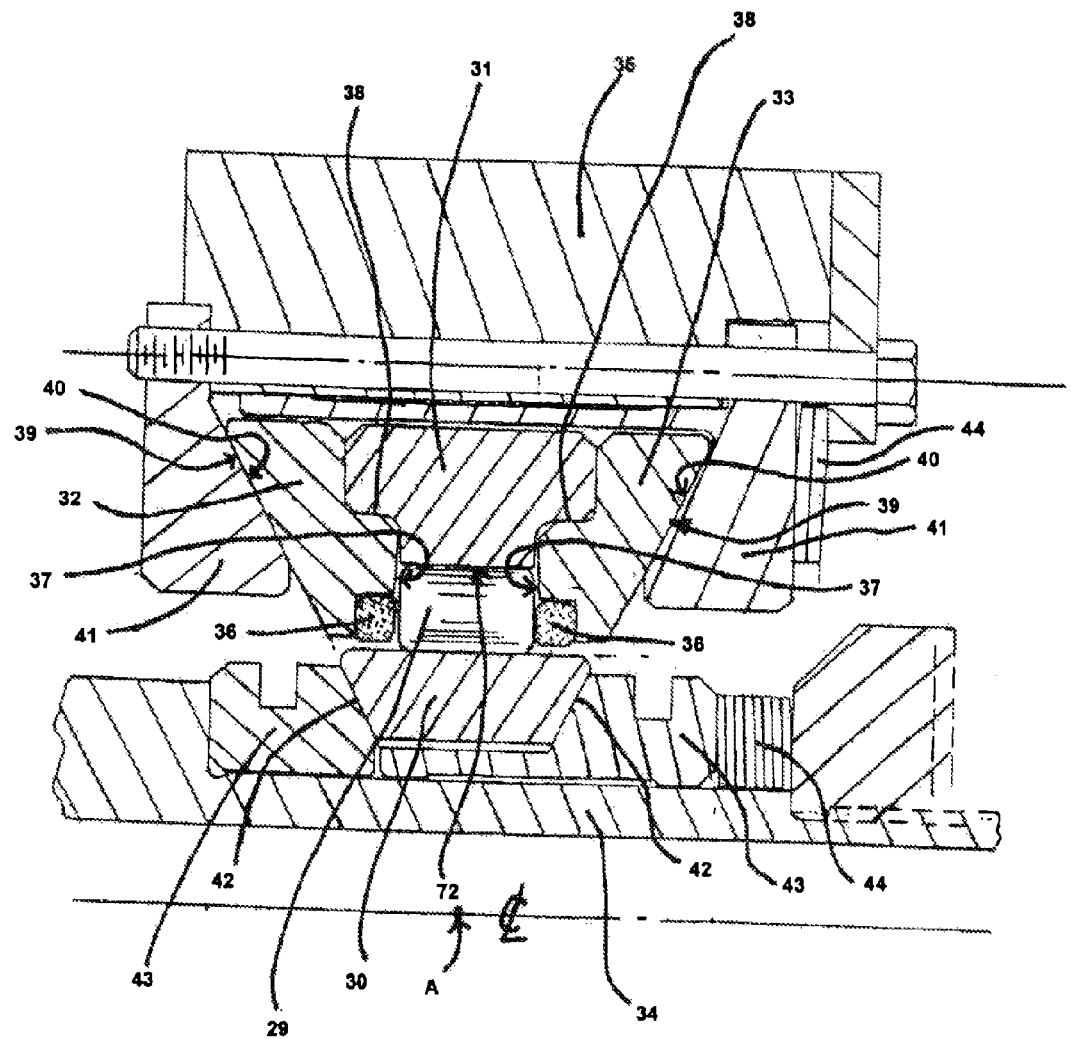
FIG. 5 is a half cross-section of an all-ceramic roller bearing mounting system for metal shafts and housings to compensate for the large differential thermal expansion of the ceramic bearing rings and the machine shaft and housing at very high operating temperatures, in accordance with one or more aspects of the present invention.

Referring now to FIG. 5, another embodiment of the present invention is depicted, showing an all-ceramic roller bearing for operation up to ultra-high temperatures, at which no bearing steel or other alloy will retain sufficiently high hot hardness to have any reasonable bearing life. Both the bearing rollers 29 and rings 30, 31, 32, and 33 are made of bearing-quality ceramic material, which has sufficient hot hardness for very high temperature operation, but also typically has significantly lower thermal expansivity than the metal alloys from which typically are made the shaft 34 and the housing 35 of high-speed, high-temperature machines. In the present embodiment of the invention shown in FIG. 5, the ceramic bearing rings 30, 31, 32, and 33 are made with mounting surfaces designed to minimize any stresses in these rings that might arise from the differential thermal expansion of the rings 30, 31, 32, and 33 compared to that of the shaft 34 and the housing 35. The bearings experience a large temperature range during service. The stresses are also minimized using the high-temperature solid lubrication systems of the present invention with solid-lubricant-film-replenishing rings 36.

In the embodiment shown in FIG. 5, the ceramic bearing outer ring assembly consists of three ceramic rings 31, 32, and 33, made as separate rings for ease of manufacture of the precision roller track 72 and flange surfaces 37, but alternatively could be made as a single ring. In the case of the three rings 31, 32, and 33 depicted in FIG. 5, the outer rings are held by precision-ground surfaces 38, or alternatively (not shown) by an interference fit inside a thin section shrink band, to maintain precise alignment between the above track and flange surfaces 72 and 37, respectively. The outside faces 39 of the two flange rings 32 and 33 are made with a taper, according to the present embodiment, having a taper angle forming two cones, each with an apex that is exactly positioned at the same coincident point on the centerline of the shaft 34, designated Point A, as best seen in FIG. 5. The tapered bearing outer-ring outside faces 39 are held between the matching tapered surfaces 40 on the metal alloy housings 41 holding this outer ring assembly in the housing 35. The interface between the tapered surfaces 40 is solid lubricated, so that as the temperature of the assembly rises, the larger thermal expansion of the metal housings 41 compared to the ceramic rings 31, 32, and 33 results only in a slight sliding of the tapered surfaces 40 over each other without any significant change in the compression between the tapered surfaces 40 holding the ring assembly in place, since the relative amount of thermal expansion in the radial direction is exactly in the same proportion as that in the axial direction for both the ring and housing assemblies, due to their taper angles having the same coincident apex on the centerline A of each assembly. In this way, the clamping pressure will neither become loose nor increase excessively over the operating temperature range of the machine.

In the same way as the outer rings 31, 32, and 33 in FIG. 5 are mounted to avoid undesirable changes in mounting fit pressure over a wide operating temperature range, the ceramic inner ring 30 also is made with tapered faces 42 having the same taper angle as described above for the outer ring assembly, according to the present embodiment. The tapered faces 42 on the inner ring 30 are clamped between solid-lubricated matching tapered surfaces on the shoulder rings 43 on the shaft 34, clamped with constant axial force by Belleville washer springs 44 on both the housing 35 and the shaft 34.

Figure 6:
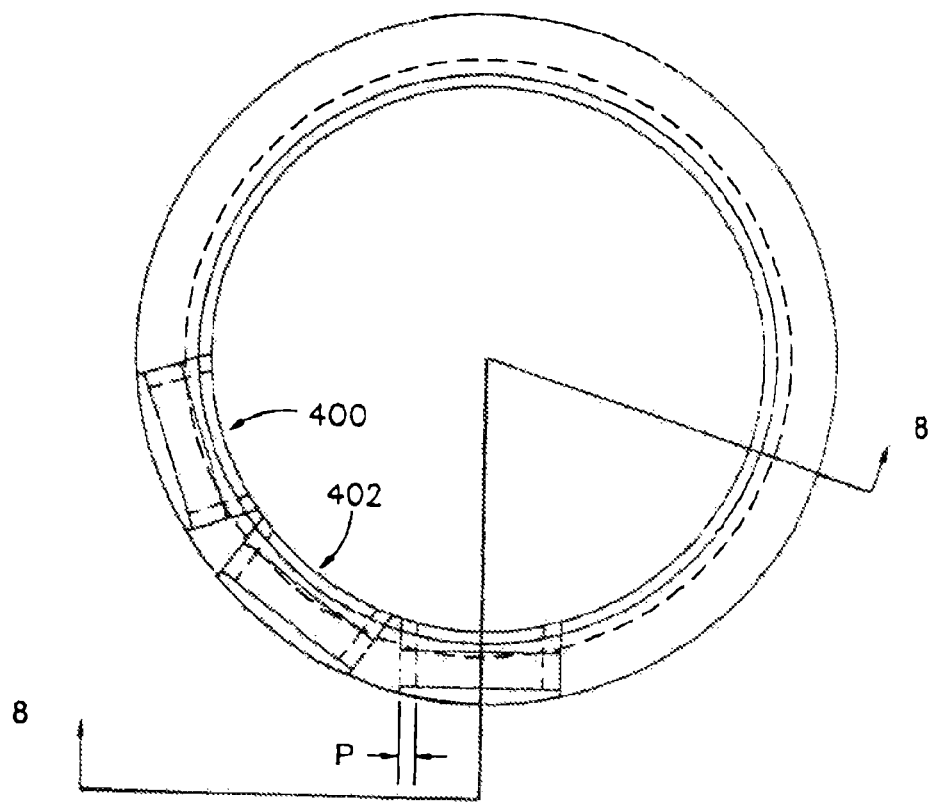
FIG. 6 is an axial view of the cage in a bearing schematically representing an embodiment of the invention in which a cage is utilized, in accordance with one or more aspects of the present invention.
Figure 7:
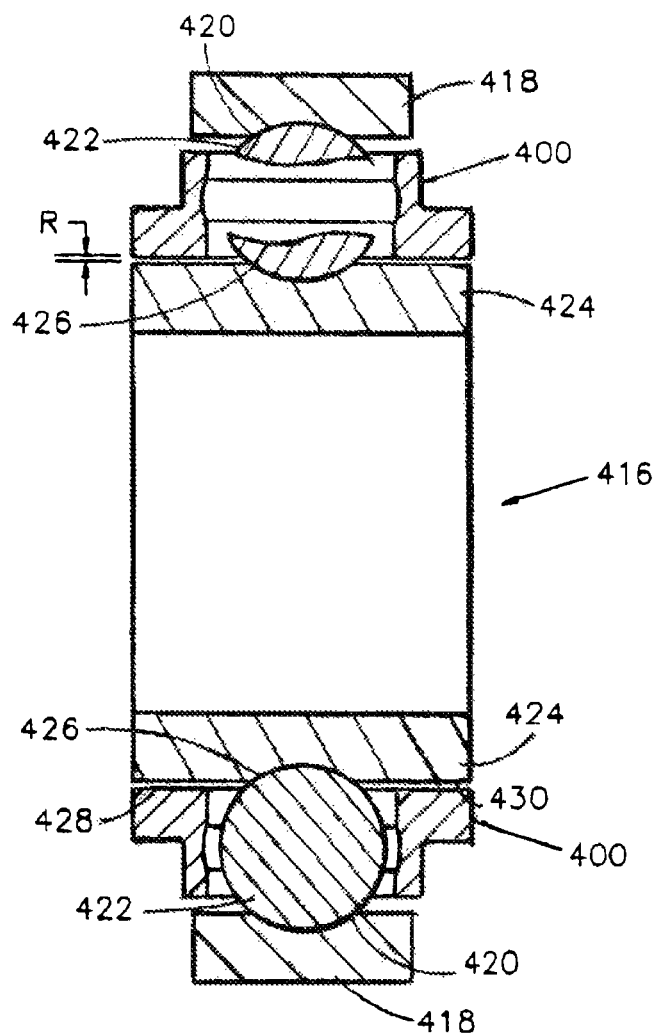
FIG. 7 is a cross-section of a cage, in accordance with one or more aspects of the present invention.
Figure 9:
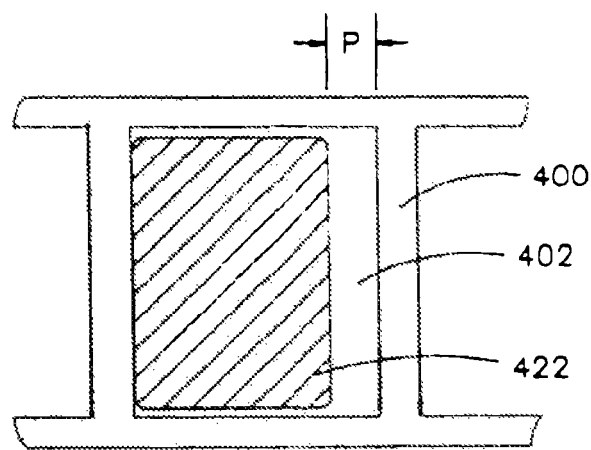
FIG. 9 is a vertical partial cross-section of a roller-bearing cage, in accordance with one or more aspects of the present invention.
Figure 8:
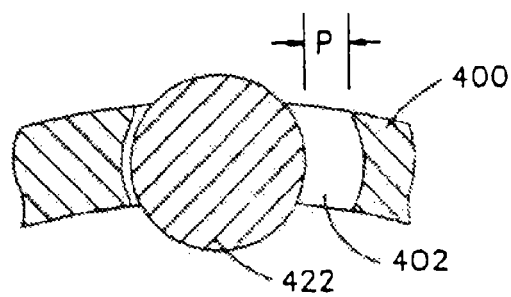
FIG. 8 is a partial cross-sectional view, taken along line 8-8 of FIG. 6, of an embodiment of the invention utilizing a bearing cage, in accordance with one or more aspects of the present invention.

Another embodiment of the present disclosure is illustrated in FIGS. 6, 7, 8, 9, and 10 and is for very high speed applications, where a continuous cage or separator of the rotatable elements is preferred over the essentially full-complement ring designs depicted in FIGS. 1, 2, 3, and 5. The cage or separator is used to limit the severity of the contact conditions between the rotatable elements generated at high speeds without creating excessive friction and wear of the solid-lubricant elements. As best seen in FIGS. 6 and 7, a cage 400 includes pockets 402 in which the individual rotatable elements 422 reside. The pockets 402 are illustrated in FIG. 8, which is a sectional view taken along line 8-8 of FIG. 6 and rotated ninety degrees.

The pockets 402 formed in the cage 400 preferably have much larger clearance, at least in the circumferential direction, than the inner ring guide lands 428 and 430 which are defined by the annularly outwardly facing surface of inner bearing member 424 on either side of outwardly facing race surface 426. This is important to facilitate orbital motion of the cage 400 together with the rotatable elements 422 thereby providing minimal or no restraint on the orbital motion of the rotatable elements 422.

An important aspect of this invention regarding the desirably low friction lubrication of the cage land surfaces 430 in contact with the inner ring lands 428, as seen in FIG. 7, is the construction of these land contacting surfaces wide enough to generate self-acting hydrodynamic lubricant films. Such films can be enhanced significantly by the centrifugal warping of the land surfaces 430 on the cage 400 from the radially outward centrifugal deflection of the cage bars 400, as depicted in FIGS. 7, 8, 9, and 10, which are supported only by the cage rails 400. The rails are thus deflected from this centrifugal force of the bars to form an undulating non-circular pattern of the cage lands 428, which approximates the desired shape of the pads in journal bearings, therefore increasing the sliding bearing load-carrying capacity of these land surfaces, which in turn will desirably decrease the friction there and produce more stable, longer bearing life.

Figure 10:
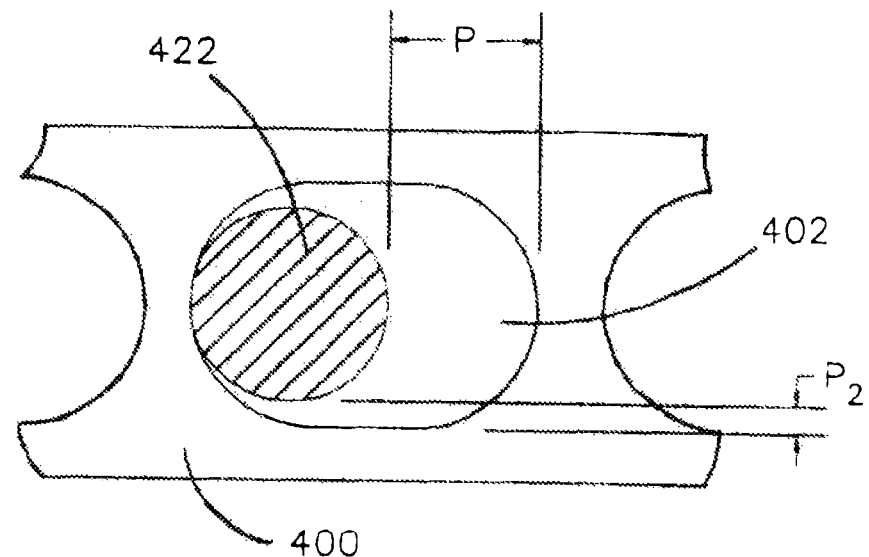
FIG. 10 is a vertical partial cross-section of a ball-bearing cage, in accordance with one or more aspects of the present invention.

By the use of advanced fully-dynamic computer design techniques to improve substantially the performance and reliability of solid-lubricated ball and roller bearings, the most significant resulting design improvement is the unusual dimensioning of the solid-lubricant member, when it is composed of the cage, such that the cage does not significantly restrain the orbiting motion of the rotatable elements (balls or rollers) any more than does the ring. This feature is quite contrary to the designs used in standard industry bearings, in which the usual practice is to make the cage pocket clearance smaller or at most the same as the guide-land clearance, instead of the much larger pocket clearance (at least in the circumferential direction) shown as P in FIGS. 8, 9, and 10. Oblong ball-bearing cage pockets with smaller clearance P2 in the axial direction are a desirable alternative, as shown in FIG. 10. The computer shows that standard cage designs self destruct, especially at high speeds, in solid-lubricated bearings—grease and oil lubricants are more tolerant of such bearing design deficiencies than solid lubricants—and the improved designs of this invention increases the lubricant life significantly with standard grease and oil lubricants.

Figure 11:
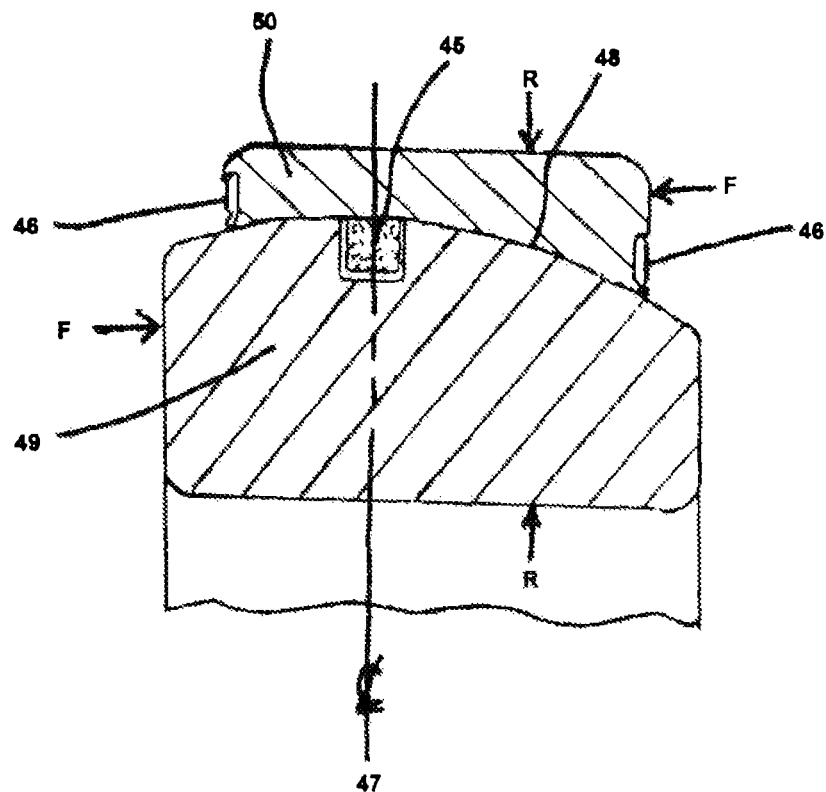
FIG. 11 is a half cross section of a spherical plain bearing with a solid-ring lubricant-film replenishment element, in accordance with one or more aspects of the present invention.

Referring to FIG. 11, the solid-lubricant ring 45 is shown in a spherical plain bearing to replenish the solid-lubricant films in this bearing in a manner similar to that in the other types of bearings shown in FIGS. 1, 2, 3, 4, and 5, so that it does not require periodic relubrication during operation, like standard bearings of this type. The seals 46 are fitted on both sides of this plain bearing to keep the solid-lubricant material inside the bearing, which in this case is made with the centerline 47 of the sphered contact surfaces 48 between the inner ring 49 and outer ring 50, so that a large axial force F can be supported in addition to a radial force R on the bearing during operation.

Figure 12:
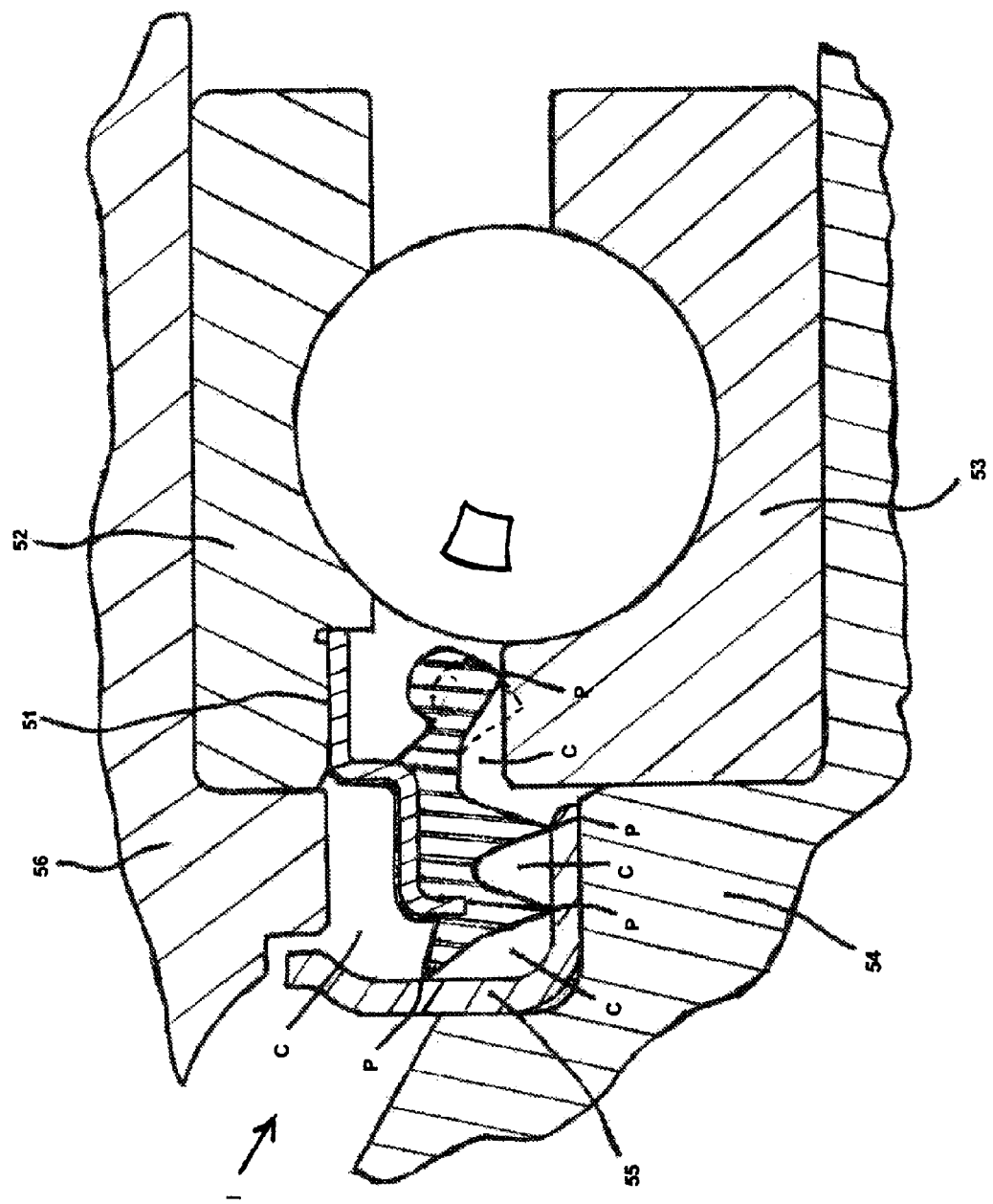
FIG. 12 is a half cross-sectional view of an improved bearing seal, in accordance with one or more aspects of the present invention.

As illustrated in FIG. 12, a molded steel-backed elastomeric seal is fitted to the outboard side I of a bearing in a wet dirty environment by pressing with an interference fit 51 into the stationary outer ring 52 of the bearing. This seal is constructed with multiple contact points P on the rotating inner ring 53 and its shaft 54 and sleeve 55 to form several cavities C, in addition to a cavity between the sleeve 55 and stationary housing 56, all of which cavities C are filled with grease to form a barrier to any water or dirt of any kind from entering the bearing. The sleeve 55 also protects the bearing and seal from impact damage from rocks impinging on the outside end I of the bearing assembly.

Figure 14:
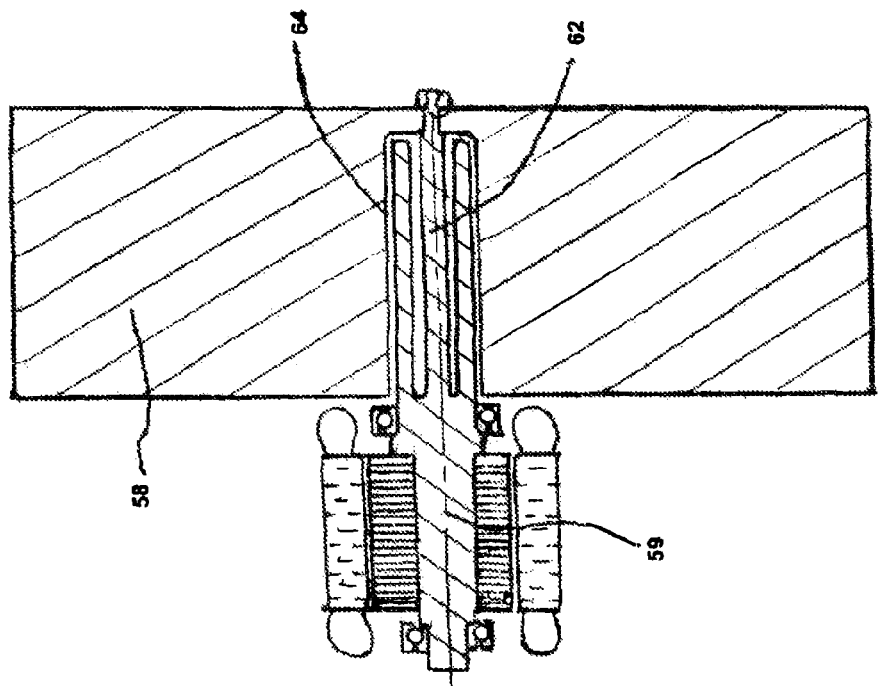
FIG. 14 is a view similar to that of FIG. 13 showing the centrifugal radial dilation of the large rotating mass at high speeds, in accordance with one or more aspects of the present invention.
Figure 13:
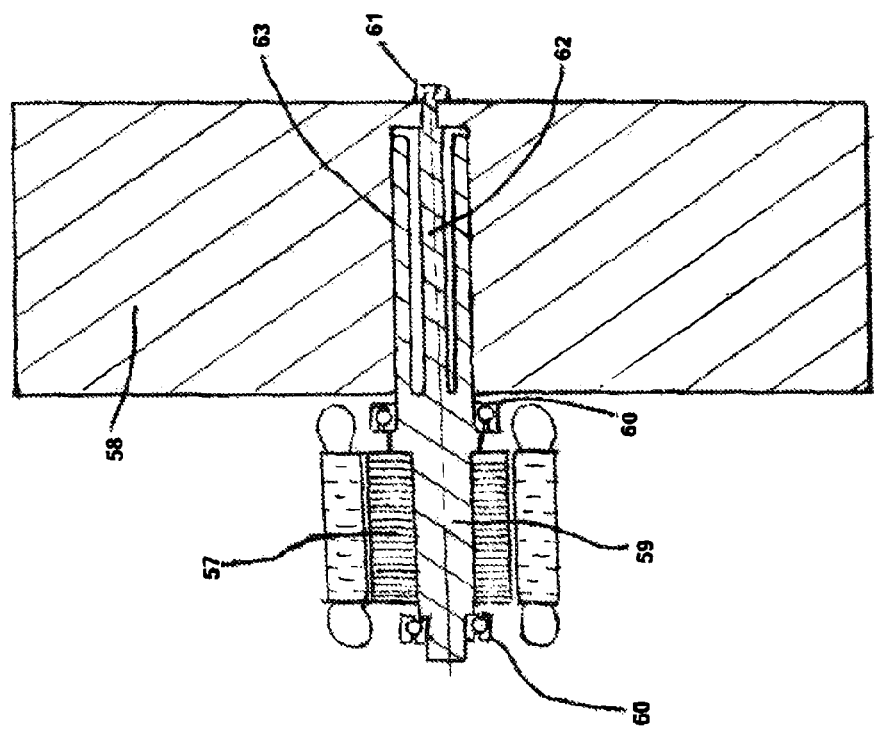
FIG. 13 is a cross-sectional view illustrating aspects of the invention in which a large mass such as a flywheel is mounted on a shaft with a motor at low rotational speeds, in accordance with one or more aspects of the present invention.

Referring now to FIGS. 13 and 14, a rotor assembly consisting of the rotor of an electric motor 57 and a large mass 58 on the same shaft 59 supported by bearings 60 is shown. The large mass 58 is held on the shaft 59 by a locknut 61 on the end of a small-diameter rod 62, and the large mass 58 is supported when assembled and at slow rotating speeds by a cylindrical surface 63 that has a small interference fit when stationary.

As best seen in FIG. 14, as the rotating speed of the rotor is increased, the centrifugal expansion of all the rotating parts, especially the large mass 58, causes the fit 63 between the shaft 59 and the mass 58 to open up into a gap 64, which forms at a speed just below the critical shaft speed that is obtained with the gap 64 closed, as seen in FIG. 13. With the gap 64 closed at slow speeds, the critical speed of the rotor is determined by the spring constant of the bearings 60, which are relatively stiff and thus result in a relatively high critical speed. Once the gap 64 opens up as the speed is increased, the rod 62 is the only connection between the shaft 59 and the large mass 58. When the gap 64 is open the critical speed of the rotor then decreases to below the rotor operating speed, resulting from the increased compliance, or reduced spring constant, of the rotor support by the relatively increased flexibility of the small-diameter rod 62 added to the much stiffer bearings.

Another important advantage of the use of a compliant rotating member like the rod 62 in FIGS. 13 and 14, over the prior art use of O-rings as vibration dampers described previously, is that the flexible rod is mounted in the rotor assembly in this invention and not in the stationary housing as in the prior art. Thus, the rotor unbalance stresses these O-rings at the rotor primary rotational frequency in the prior art, which generates heat in the elastomeric material from which the O-rings are made, thus limiting their life. Unlike the O-rings, the flexible rod of the present invention is not subjected to this unbalance cyclic stress. As the flexible rod rotates in phase with the unbalance above the critical frequency after lift-off on the surface 63, as seen in FIG. 13, and forms the gap 64, seen in FIG. 14. There will be no cyclic stressing of the rod in the present invention, so that there are no hysteresis losses and very low friction drag on the rotor for the above reason.

FIGS. 13 and 14 illustrate the manner in which the vibration-decoupling device described above is designed and operated to achieve extremely low vibration amplitudes and bearing loads over the entire wide operating speed range of flywheel energy storage systems and any other high-speed supercritical rotor in a wide variety of machinery.

Figure 15:
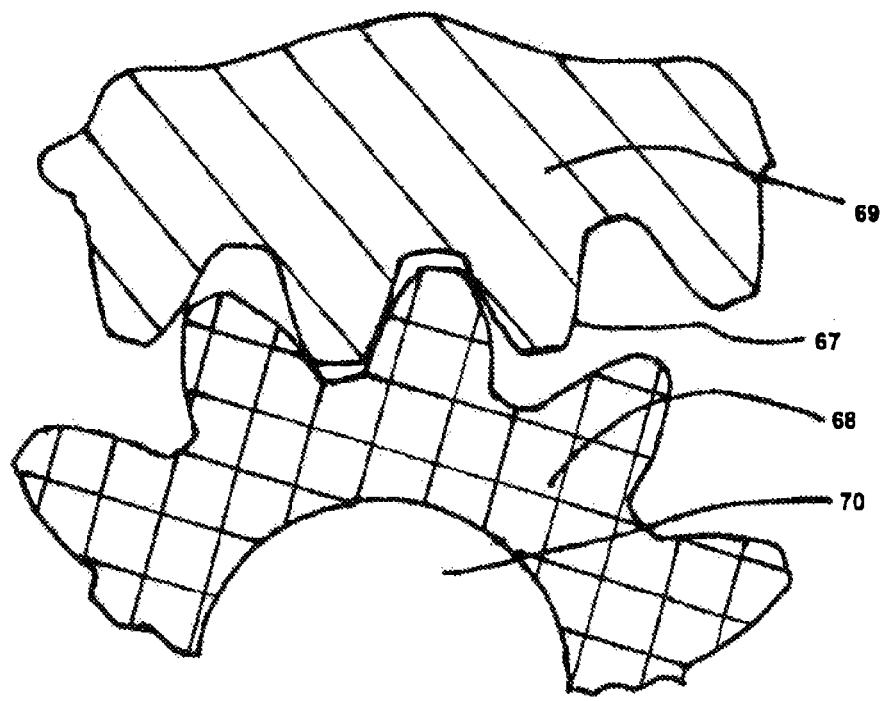
FIG. 15 is a partial end view of the gear-teeth contact between one of the meshing gears in a gear-set and an idler gear made of a solid lubricant, in accordance with one or more aspects of the present invention.

FIG. 15 illustrates the replenishment of the solid-lubricant films on the contacting surfaces of gear teeth 67 by means of an idler gear 68 in contact with one of the gears 69 in a gear set, with the solid-lubricant idler gear 68 supported on a shaft 70 with a small clearance on the shaft 70 and with the gear teeth 67, so that random impacts of the gear teeth contact surfaces with the solid-lubricant idler gear 68 produces sub-micron size wear particles of solid lubricant that get caught in the mesh of the gear teeth 67, thus replenishing the solid-lubricant films there for very long life with no need for relubrication, since the total amount of lubricant material required to provide sufficient gear-teeth lubrication is so tiny that the life of the solid-lubricant idler gear 68 is very long, in the order of ten to twenty years maintenance-free.

The invention has been described with reference to the preferred embodiments as well as several alternative embodiments. It will be understood that the architectural and operational embodiments described herein are exemplary of a plurality of possible arrangements to provide the same general features, characteristics, and general system operation. Modifications and alterations will occur to others upon a reading and understanding of the preceding detailed description. It is intended that the invention be construed as including all such modifications and alterations.

The invention claimed is:

1. A solid lubricated bearing assembly, comprising:
   rotatable bearing elements;
   an outer member having a generally radially inwardly facing inner annular race adapted to receive the rotatable bearing elements for rotating motion thereof relative to the outer member;
   an inner member having a generally radially outwardly facing outer annular race adapted to receive the rotatable bearing elements for rotating motion thereof relative to the inner member, the rotatable bearing elements being retained between the inner race and the outer race; and
   a first element of solid-lubricant material retained close to the rotatable bearing elements for (a) making occasional, non-continuous contact with at least one of the rotatable bearing elements and (b) depositing solid lubricant wear debris to create a solid lubricant film on at least one of the rotatable bearing elements as the bearing elements rotate relative to the races.

2. The bearing assembly of claim 1, wherein the first element of solid-lubricant material is circumferentially positioned around the inner member and between the inner member and the rotatable bearing elements.

3. The bearing assembly of claim 1, further comprising:
   a second element of solid-lubricant material retained close to the rotatable bearing elements for (a) making occasional, non-continuous contact with at least one of the rotatable bearing elements and (b) depositing solid lubricant wear debris to create a solid lubricant film on at least one of the rotatable bearing elements as the rotatable bearing elements rotate relative to the races.

4. The bearing assembly of claim 3, wherein the rotatable bearing elements are cylindrical rollers having a first end and a second end.

5. The bearing assembly of claim 4, wherein the first element of solid-lubricant material is positioned along the first end of the cylindrical rollers and the second element of solid-lubricant material is positioned along the second end of the cylindrical rollers.

6. The bearing assembly of claim 1, wherein the first element of solid-lubricant material is positioned to one side of the rotatable bearing elements axially.

7. The bearing assembly of claim 1, wherein the rotatable bearing elements are tapered rollers having a first end which tapers into a second end.

8. The bearing assembly of claim 7, wherein the first end of the tapered roller has a radius that is larger than the radius of the second end of the tapered roller, and the first element of solid-lubricant material is positioned along the first end of the tapered rollers.

9. The bearing assembly of claim 1, wherein the outer member and inner member are made of a ceramic material.

10. The bearing assembly of claim 1, further comprising:
    a sealing member circumferentially positioned between the outer member and the inner member for containing the solid-lubricant wear debris within the bearing assembly and inhibiting entry of contaminants into the bearing assembly.

11. The bearing assembly of claim 1, further comprising:
    a cage circumferentially positioned between the rotatable bearing elements for maintaining the rotatable bearing elements in spaced relation to one another while permitting rotation of the rotatable bearing elements in the races.

12. The bearing assembly of claim 11, wherein the cage pocket is larger in the orbital direction than it is in the axial direction.

13. The bearing assembly of claim 1, wherein the rotatable bearing elements, the outer member, and the inner member are comprised of low-coefficient of expansion ceramic material, the bearing assembly comprising: a housing comprised of non-ceramic material with a higher coefficient of expansion than the low-coefficient of expansion ceramic material, the housing configured to support the outer member,
    the housing including two tapered housing support members adapted to receive and coupled to the outer member by mating with similarly tapered faces of the outer member;
    a shaft comprised of non-ceramic material with a higher coefficient of expansion than the low-coefficient of expansion ceramic material, the shaft configured to support the inner member, the shaft including two tapered shaft support members adapted to receive and coupled to the inner member by mating with similarly tapered faces of the inner member;
    wherein the tapered mating surfaces are pre-coated with a solid lubricant material and allowed to slide relative to each other to accommodate the difference in thermal expansion between (a) the bearing elements, the outer member, and the inner member, each comprised of low-coefficient of expansion ceramic material and (b) the housing and shaft, each comprised of non-ceramic material with a higher coefficient of expansion than the low-coefficient of expansion ceramic material.

14. The bearing assembly of claim 13, further comprising:
    one or more springs between the inner member and one of the tapered shaft support members; and
    one or more springs between the outer member and one of the tapered housing support members.

15. The bearing assembly of claim 13, wherein the angles of the tapers have the same coincident apex on the centerline of the bearing assembly, which angles allow for a thermal expansion in the radial direction of the housing and shaft support members that is substantially in the same proportion as the thermal expansion of the housing and support members in the axial direction.

16. The bearing assembly of claim 13, wherein the housing is adapted to provide (a) a radial gap between an outer surface of the outer member and an inner surface of the housing and (b) a radial gap between the inner surface of the inner member and an outer surface of the shaft, the gap allowing space for the mating surfaces to slide relative to each other to accommodate the difference in thermal expansion without the addition of significant compressive forces on the outer or inner member.

17. The bearing assembly of claim 13, wherein the first element of solid-lubricant material is circumferentially positioned between the outer member and the inner member.

18. The bearing assembly of claim 1, wherein the first element of solid-lubricant material is in the shape of a continuous non-broken solid ring.

19. The bearing assembly of claim 1, wherein the first element of solid-lubricant material is contained with the bearing assembly by a shield fitted to the bearing assembly.

20. The bearing assembly of claim 1, wherein the wear debris is comprised primarily of substantially sub-micron size particles.

21. The bearing assembly of claim 1, wherein the solid lubricant film created on the at least one of the rotatable bearing elements by the depositing of the solid lubricant wear debris is on the order of a few millionths of an inch thick.

22. The bearing assembly of claim 1, wherein the rotatable bearing elements are ceramic.

23. The bearing assembly of claim 1, wherein the first element of solid-lubricant material is positioned substantially to one side of at least one of the rotatable bearing elements axially.

24. The bearing assembly of claim 1, wherein the rotatable bearing elements are arranged in a single row and the first element of solid-lubricant material is positioned substantially between the bearing elements and a sealing member.

* * * * *